United States Patent
Wredenhagen et al.

(10) Patent No.: US 7,127,123 B2
(45) Date of Patent: Oct. 24, 2006

(54) SYSTEM AND METHOD FOR DYNAMICALLY ENHANCED COLOR SPACE

(75) Inventors: G. Finn Wredenhagen, Toronto (CA); Peter Ang, Scarborough (CA)

(73) Assignee: Jaldi Semiconductor Corp., Richmond Hill (CA)

( * ) Notice: Subject to any disclaimer, the term of this patent is extended or adjusted under 35 U.S.C. 154(b) by 633 days.

(21) Appl. No.: 10/177,766

(22) Filed: Jun. 24, 2002

(65) Prior Publication Data

US 2003/0117654 A1  Jun. 26, 2003

(30) Foreign Application Priority Data

Dec. 21, 2001  (CA) .................................. 2365893

(51) Int. Cl.
*G06K 9/00* (2006.01)
*G06K 9/40* (2006.01)

(52) U.S. Cl. ...................... 382/274; 382/169
(58) Field of Classification Search ................ 382/169, 382/274
See application file for complete search history.

(56) References Cited

U.S. PATENT DOCUMENTS

| | | | |
|---|---|---|---|
| 4,852,002 A * | 7/1989 | Klausz | 382/274 |
| 5,982,926 A * | 11/1999 | Kuo et al. | 382/167 |
| 6,078,686 A | 6/2000 | Kim | |
| 6,493,468 B1 * | 12/2002 | Matsuura | 382/274 |
| 6,738,161 B1 * | 5/2004 | Moriwaki | 358/1.9 |
| 6,757,442 B1 * | 6/2004 | Avinash | 382/274 |

* cited by examiner

*Primary Examiner*—Bhavesh M. Mehta
*Assistant Examiner*—Wes Tucker
(74) *Attorney, Agent, or Firm*—Marger Johnson & McCollom P.C.

(57) ABSTRACT

Contrast in an image is enhanced by mapping an input intensity value to an output intensity value in accordance with a mapping function. A mean intensity value of the image is determined. Co-ordinates of the mapping function are calculated in accordance with the mean intensity value and a plurality of predefined parameters. The mapping function is applied to the input intensity value for determining the output intensity, wherein the mapping function is generated dynamically for each image.

23 Claims, 5 Drawing Sheets

SYSTEM AND METHOD FOR DYNAMICALLY ENHANCED COLOR SPACE

This present invention relates to the field of image displays, and more particularly, to a system and method for improving contrast and colour in digitized displays.

BACKGROUND OF THE INVENTION

Image contrast is usually achieved by rearranging the distribution of gray levels in an image scene. Increasing the contrast of an image is accomplished by making the dark portions of the image darker and the light portions of the image lighter. The effect of redistributing the gray levels is often visually beneficial because redistribution of gray levels uses more of an available dynamic range of a black to white intensity spectrum. Often the redistribution of energy is performed with the aid of a non-linear function.

Many approaches have been devised to improve the contrast of an image. Histogram equalization is a method that has been used to alter the contrast of an image by attempting to redistribute the gray level energy in the image such that the output distribution is uniform. However, histogram equalization suffers from a serious drawback because the effects of full equalization are usually too severe to be visually pleasing. This method has some preferred uses such as in medical imaging, where colour balance is not always as important as accentuating gray level detail. In video and film processing, however, histogram equalization is not used because maintaining a proper proportion of gray level through the image spectrum is important.

More recently, adaptive histogram equalization has received much attention. The basic idea behind adaptive histogram equalization is to generate a histogram of pixel intensities in an image and normalize them to produce a cumulative density function (CDF). Then, an altered version of the CDF is used to map the intensity, or gray level, data in an image to change the contrast. Even more sophisticated methods use local histogram information and local image statistics on a region of the image in order to achieve the desired context-dependent level of contrast enhancement.

However, all of the state of the art solutions to the problem of contrast enhancement still have results that have room for improvement. Therefore, it desirable that to develop a system and a method for providing an image that is more visually pleasing than the original and can be readily implemented on a microprocessor.

SUMMARY OF THE INVENTION

In accordance with an aspect of the present invention there is provided a method for enhancing contrast in an image by mapping an input intensity value to an output intensity value in accordance with a mapping function. The method comprises several steps. A mean intensity value of the image is determined. Co-ordinates of the mapping function are calculated in accordance with the mean intensity value and a plurality of predefined parameters. The mapping function is applied to the input intensity value for determining the output intensity, wherein the mapping function is generated dynamically for each image.

BRIEF DESCRIPTION OF THE DRAWINGS

An embodiment of the present invention will now be described by way of example only with reference to the following drawings in which.

DETAILED DESCRIPTION OF THE PREFERRED EMBODIMENT

Figure 1:
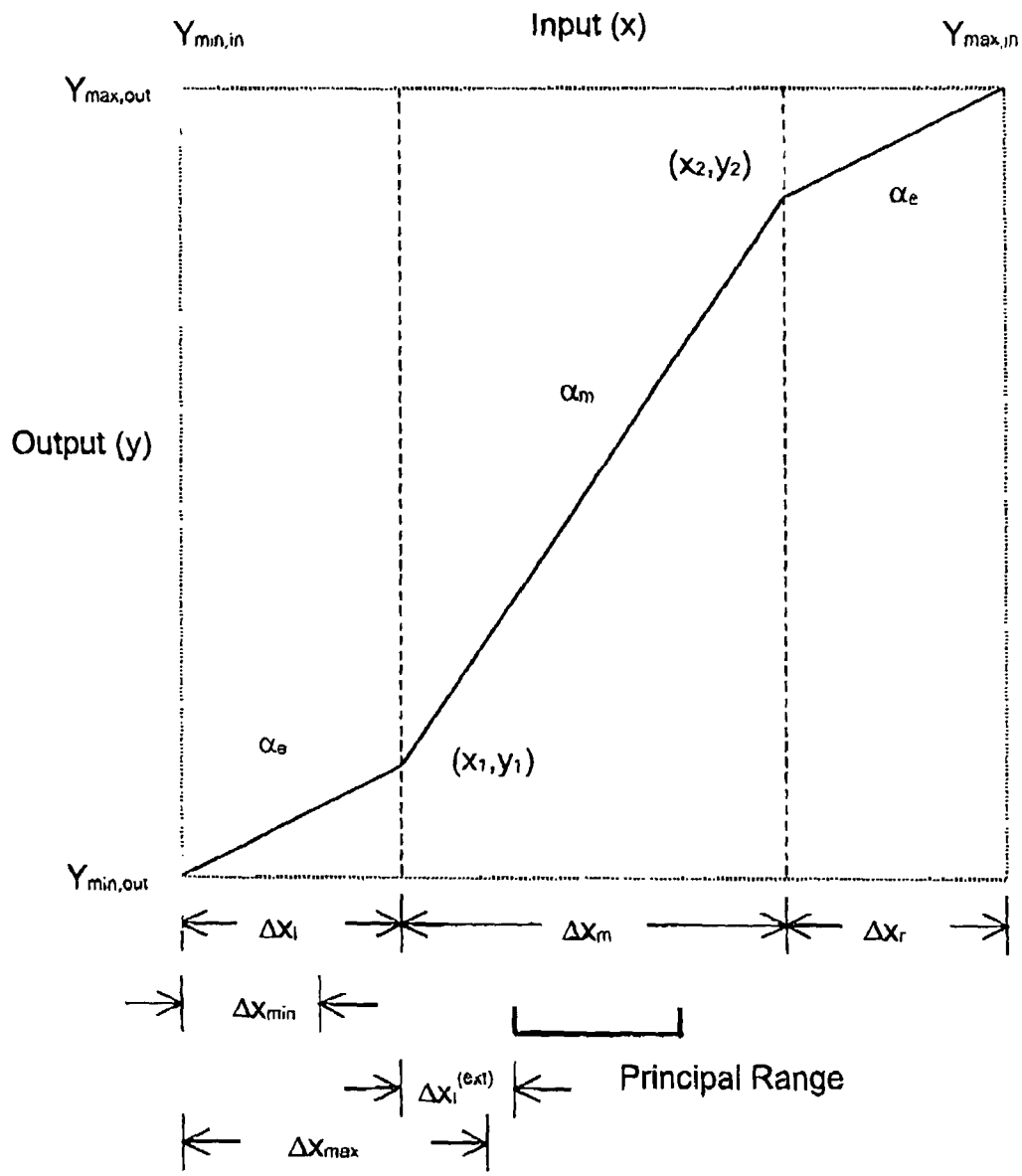
FIG. 1 is a graph illustrating a general contrast enhancement mapping function.

Contrast enhancement is accomplished by mapping an original pixel intensity to a desired pixel intensity. Typically, the mapping has a one-to-one relationship. A histogram is generated from image data and the mean value of the image intensity is computed. The mean and histogram information help define a piecewise-linear mapping that is used to alter the intensity distribution. User preferences also help determine the degree of contrast and colour enhancement. Referring to FIG. 1, a mapping function is illustrated generally by numeral 100. The mapping function 100 is piecewise linear and comprises smaller slopes 102 at each end of the range for compressing a dark (left) region 104 and a bright (right) region 106 and a steeper slope 108 for expanding a mid-intensity (middle) region 110 of the range. In the context of the present description, compression refers a linear mapping that has a gain (slope) of less than unity. Expansion refers to a linear mapping that has a gain (slope) greater than unity. If the linear mapping has a gain (slope) that is precisely unity, then neither compression nor expansion occurs. In the present embodiment it is possible for the slopes of line segments to be less than, equal to, or greater than one.

Figure 2:
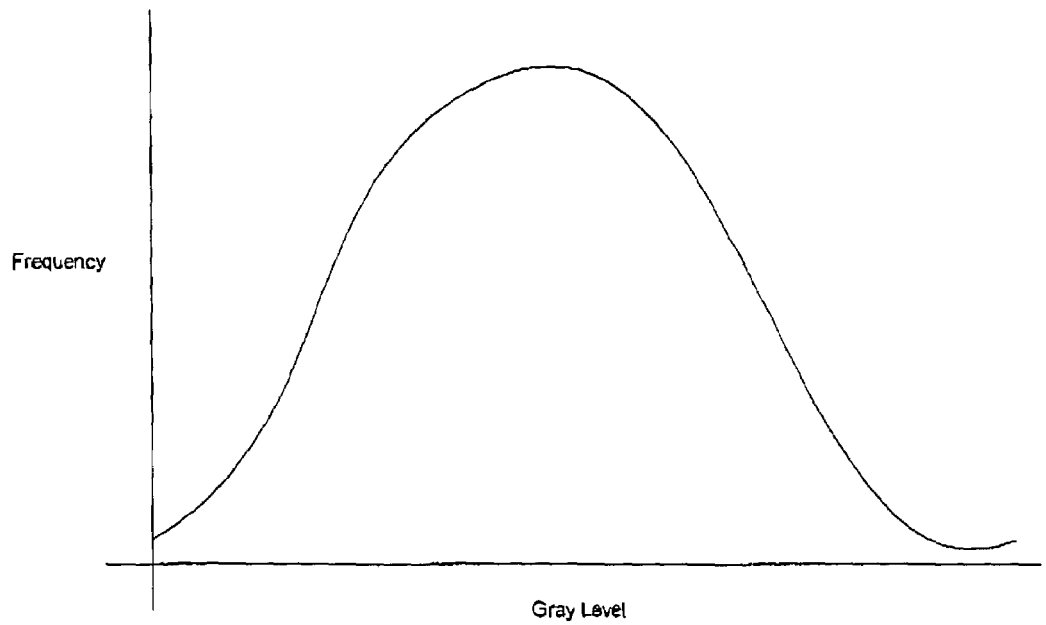
FIG. 2 is a graph illustrating a unimodal distribution of intensity in an image.

The mapping function, configured by a user or system-designer, is applied to all images in a video sequence. This approach is adequate for images having a unimodal intensity distribution. Referring to FIG. 2, an example of unimodal intensity distribution of an image is illustrated generally by numeral 200. An example of a gray level intensity distribution is one that resembles a Gaussian distribution. As illustrated, the bulk of the pixel intensity distribution lies in the mid-intensity region 110, which is to be expanded by the mapping. The remaining pixel intensity distribution lies in either the dark 104 or bright 106 regions, which are to be compressed by the mapping. Thus, the dynamic range of the image intensity is increased.

Figure 3:
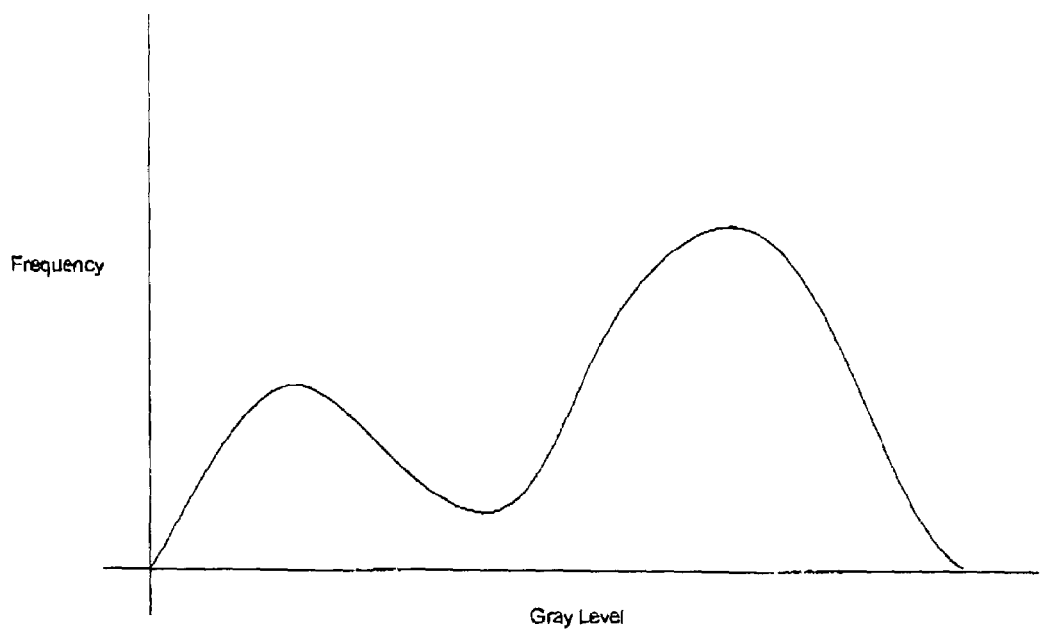
FIG. 3 is a graph illustrating a bimodal distribution of intensity in an image.
Figure 4:
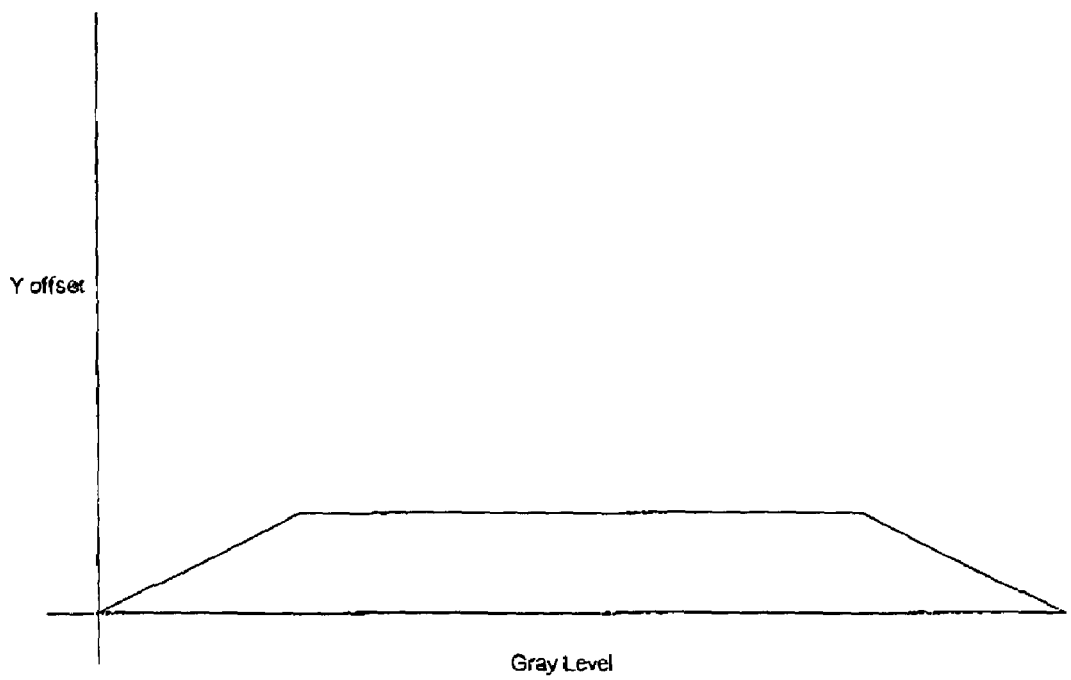
FIG. 4 is a graph illustrating an additive non-linear intensity offset that increases overall intensity without sacrificing dynamic range.

However, for images with bimodal distributions, the mapping as described above does not necessarily work well. Referring to FIG. 3, an example of bimodal intensity distribution of an image is illustrated generally by numeral 300. As illustrated, a bimodal distribution is a distribution wherein the gray level energy has been clearly separated into two distinct regions having two distinct peaks at the dark 104 and bright 106 regions. Thus, if the typical mapping as described for the unimodal intensity distribution is applied to a bimodal distribution, it will compress the dark and bright regions where the bulk of the distribution lies, which will result in an image of lesser visual appeal. The desired method for handling bimodal images is to compress the dark and bright regions only slightly, if at all. If compression is applied then it is typically much less than what is normally applied for the unimodal case.

As described above, images with unimodal and bimodal image intensity distributions are processed differently. In the case of an image with unimodal intensity distribution, the highest level of compression occurs in the dark and bright regions and highest level of expansion occurs in the mid-gray region. If the image has a bimodal intensity distribution, then there is typically little, if any, compression.

In the present embodiment, there are four categories into which an image intensity distribution can be grouped. Three of these categories represent unimodal distribution and depend on the position of the image intensity distribution's mean. In each of these three categories the mean is located in the in the mid-gray region, the dark region, and the bright region respectively. The fourth category respresents bimodal distribution with negligible content in the mid-gray region.

For the three, unimodal categories, it is desirable to have small gains for the left and right ranges and a high gain for the middle range. However, the middle range should coincide with the region where a bulk of the image's intensity distribution lies for allowing maximum utilization of the high gain factor. This is achieved by letting the middle range track the position of the mean. For example, if the mean lies in the dark region, then the middle range is shifted toward the left, the left range contracts, and the right range expands.

For the bimodal category, it is desirable to have a more moderate gain for the left and right ranges that is not as small as the gain for the left and right ranges in the unimodal categories. Similarly, it is desirable to have a more moderate gain for the middle range that is not as large as the gain for the middle range in the unimodal categories. Because the compression and expansion factors are modest in the bimodal category, the precise position of the middle range is not as significant as for the unimodal categories.

A unified solution is introduced that satisfies the requirements for each of the four categories. First, a notion of a principal range is introduced. The principal range is contained within the middle range. As the middle range shifts horizontally, so does the principal range. The number of pixels that lie within the principal range is counted. If a large percentage of pixels fall in the principal range the intensity distribution is likely unimodal. Alternately, if a small percentage of pixels fall in the principal range the intensity distribution is likely bimodal. Thus, once the modality of the image is determined, a mapping function is applied accordingly.

In summary, the middle segment (and the principal range) tracks the mean. The gain for the left and right ranges is inversely proportional to the percentage of pixels that lie in the principal range. The gain for the middle range is proportional to the percentage of pixels that lie in the principal range.

Figure 5:
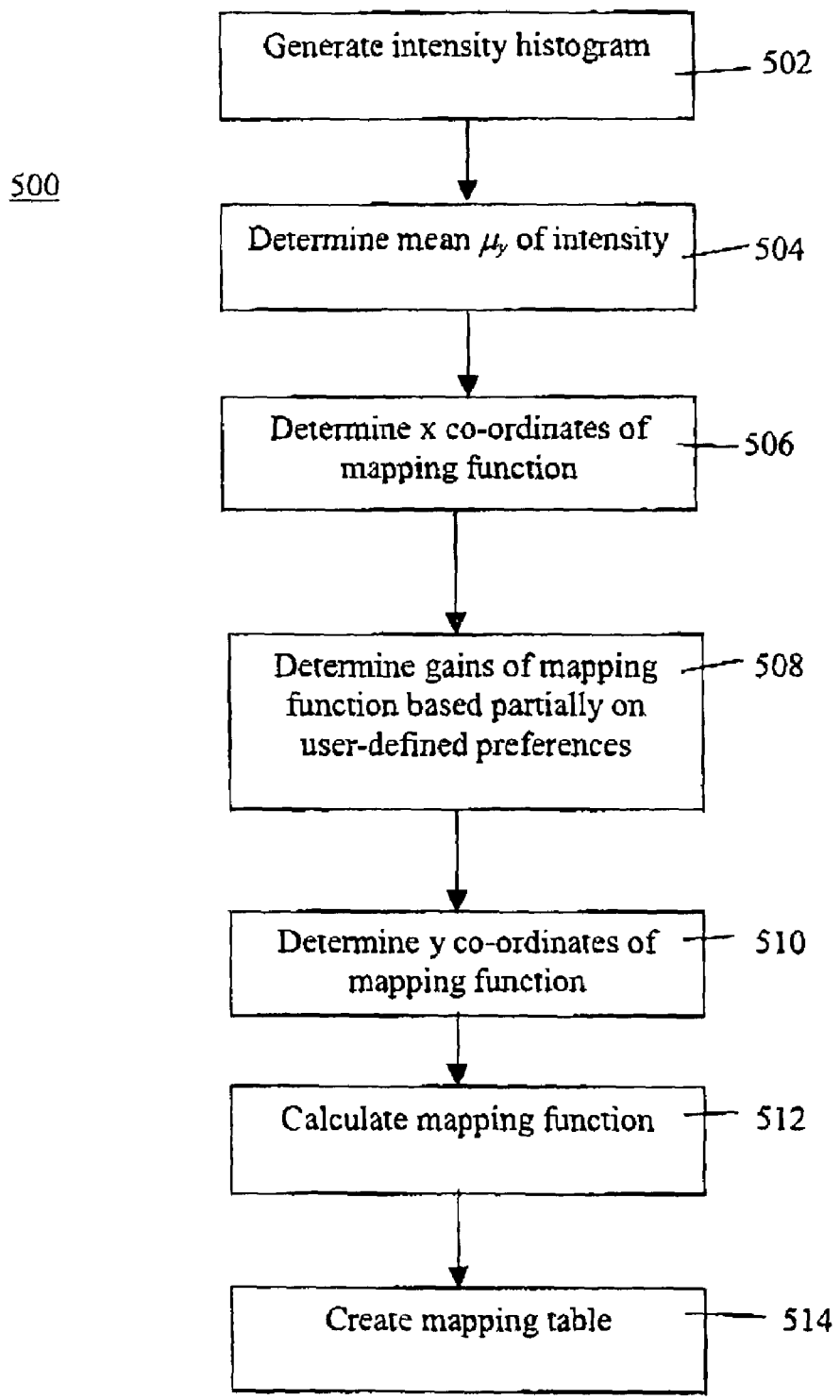
FIG. 5 is a flow chart of a method for dynamically creating a mapping function as illustrated in FIG. 1.

Referring to FIG. 5, a flow chart outlining a detailed description of dynamically generating the mapping function is illustrated. It is desired to determine a mean $\mu_Y$ of the intensity. In the present embodiment, a histogram is generated 502. A histogram, for the purpose of this description, is a representation of the distribution of intensity values of gray levels in an image. The gray level range in an image is divided into a number of bins $N_{bin}$ defined by upper and lower thresholds. A counter is assigned to each bin. For every pixel whose gray level falls within the upper and lower thresholds of a bin, the corresponding counter is incremented. To make the most effective use of bit allocation, the number of bins, $N_{bin}$, can be made a power of two. The image contains R rows and C columns, thus the total pixel count is R×C, which is equal to a total number of pixels $N_{pix}$ in the image.

The image intensity distribution information is collected by the histogram in real-time. This timing constraint can be readily met if the histogram is implemented in hardware. In hardware, a histogram is merely a combination of counters, comparators, and control logic. Each counter corresponds to a bin and is incremented whenever a pixel intensity value falls within the thresholds for that bin. The size of the counters is large enough to accommodate the total number of pixels of an image $N_{pix}$.

The thresholds that define the boundaries of the bins can either be integer or real. For integer data, it is preferable to define the boundaries as integers. The thresholds are 8 bits in size to support the data range of 256 bits. It will, however, be apparent to a person skilled in the art that the histogram generation process is not limited to 8 bits.

The range of values that comprise the intensity is referred to as the dynamic range. For an image data format that has a reduced intensity range (for example, when Y is limited from 16 to 235 in 8-bit YUV422), the histogram is calculated only for that reduced range. The dynamic range is divided into bins. In general, the input and output dynamic ranges can be different, and are denoted as $\Delta Y_{dyn,in}$ and $\Delta Y_{dyn,out}$, respectively. The lower and upper bounds of the dynamic ranges are denoted by $Y_{min,in}$ and $Y_{max,in}$, respectively, for the input, and $Y_{min,out}$ and $Y_{max,out}$, respectively, for the output. Therefore, the dynamic range can be calculated as:

$$\Delta Y_{dyn,in} = Y_{max,in} - Y_{min,in}$$

$$\Delta Y_{dyn,out} = Y_{max,out} - Y_{min,out}$$

The lower and upper bounds of the dynamic ranges are predetermined, and may be design or user-defined parameters. The range of each bin is determined as the dynamic input range divided by the number of bins $N_{bin}$.

The mean $\mu_Y$ of the intensity level of all pixels in an image is calculated from the histogram 504. This is achieved by keeping a sum of the intensity values in the image and then dividing it by the number of pixels in the image. The mean $\mu_Y$ of the intensity is defined as:

$$\mu_Y = \frac{1}{N_{pix}} \sum_{i=1}^{N_{pix}} Y_i$$

where $Y_i$ represents the intensity value for an $i^{th}$ input pixel. The mean value assists in determining whether the histogram is skewed toward the dark or lighter region for a unimodal distribution. Alternately, the mean can be approximated because a counter that counts up to R×C exactly is not always practical.

Once the mean is determined, it is used to set up the left, middle, and right ranges of the mapping function. The mapping function maps an input level value to an output level value. The mapping is implemented as a three-segment, piecewise linear mapping that in not necessarily continuous. If the mapping is such that the minimum and maximum values are exceeded, then the appropriate clipping is done to ensure the output value remains within the desired range. The linear segments comprising the mapping need not be connected. The mapping is represented by a two-dimensional Cartesian graph, as illustrated in FIG. 1, where the input lies along the x-axis and the output lies along the y-axis. The three segments are defined by four points $(Y_{min,in}, Y_{min,out})$, $(x_1, y_1)$, $(x_2, y_2)$, and $(Y_{max,in}, Y_{max,out})$.

Points $(x_1, y_1)$ and $(x_2, y_2)$ are located between points $(Y_{min,in}, Y_{min,out})$ and $(Y_{max,in}, Y_{max,out})$ and are referred to as interior points. Their positions are computed based on the histogram and its mean value. A line segment from point $(Y_{min,in}, Y_{min,out})$ to point $(x_1,y_1)$ is referred to as a left segment. The range of input for the left line segment is referred to as a left input range $\Delta x_l$. A line segment from point $(x_1,y_2)$ to point $(x_2,y_2)$ is referred to as a middle segment. The range of input for the middle line segment is referred to as a middle input range $\Delta x_m$. A line segment from point $(x_2,y_2)$ to point $(Y_{max,in}, Y_{max,out})$ is referred to as a right segment. The range of input for the right line segment is referred to as a right input range $\Delta x_r$.

Since the mapping function is piecewise linear, each segment of the mapping function is can be represented by the equation y=mx+b, where m is a slope of the line segment and b is a y-intercept. The interior points are determined in accordance with the above equation as follows.

A maximum input range $\Delta x_{max}$ for both the left input range $\Delta x_l$ and the right input range $\Delta x_r$ is defined as:

$$\Delta x_{max} = \Delta Y_{dyn,in} - \Delta x_m - \Delta x_{min}$$

where $\Delta x_{min}$ is a predefined minimum permissible input range for both the left input range $\Delta x_l$ and the right input range $\Delta x_r$. The middle input range $\Delta x_m$ is also a predefined value, and is at least as wide as the principal range.

The left input range $\Delta x_l$ is defined as:

$$\Delta x_l = \frac{\Delta x_{max} - \Delta x_{min}}{\Delta Y_{dyn,in}}(\mu_Y - Y_{min,in}) + \Delta x_{min}$$

$$= \frac{\Delta Y_{dyn,in} - \Delta x_m - 2\Delta x_{min}}{\Delta Y_{dyn,in}}(\mu_Y - Y_{min,in}) + \Delta x_{min}$$

Therefore, it can be seen that the the left input range $\Delta x_l$ is determined in accordance with the mean $\mu_Y$ of the intensity.

An extension $\Delta x_l^{(ext)}$ to the left input range $\Delta x_l$; helps mark the left boundary of the principal range. This value is used because the length of the middle input range $\Delta x_m$ is longer than the principal range. The extension $\Delta x_l^{(ext)}$ is defined as:

$$\Delta x_l^{(ext)} = \frac{\Delta x_m - N_{bin,p} \cdot binSize}{2} - \frac{binSize}{2}$$

$$= \frac{\Delta x_m - (N_{bin,p} + 1) \cdot binSize}{2}$$

where the width of the principal range in number of bins $N_{bin,p}$ is an integer, and each bin has a range of binSize. The purpose of subtracting (binSize/2) is to make the principal range half a bin larger on each end. Therefore, even if the principal range does not align with the bin boundaries exactly, the number of bins within the principal range is still equal to $N_{bin,p}$.

The left boundary of the principal range is determined by summing the left input range $\Delta x_l$ and the extension $\Delta x_l^{(ext)}$ with the input lower boundary $Y_{min,in}$ of the input dynamic range $\Delta Y_{dyn,in}$.

$$Y_{min,in} + \Delta x_l + \Delta x_l^{(ext)}$$

Therefore, since the left input range $\Delta x_l$ is dependant on the mean $\mu_Y$ of the intensity, the position of the principal range is dependent on the position of the mean $\mu_Y$ of the intensity.

The right boundary of the principal range is determined by summing the left input range $\Delta x_l$, the extension $\Delta x_l^{(ext)}$, and the width of the principal range $N_{bin,p} \times binSize$ with the input lower boundary $Y_{min,in}$ of the input dynamic range $\Delta Y_{dyn,in}$.

$$Y_{min,in} + \Delta x_l + \Delta x_l^{(ext)} + N_{bin,p} \times binSize$$

The right input range $\Delta x_r$ is defined as:

$$\Delta x_r = \Delta Y_{dyn,in} - \Delta x_m - \Delta x_l$$

The x co-ordinates of the mapping function are now known 506. The x co-ordinate of the first interior point $(x_1, y_1)$ is determined by summing the left input range $\Delta x_l$ with the input lower boundary $Y_{min,in}$ of the input dynamic range $\Delta Y_{dyn,in}$.

$$x_l = Y_{min,in} + \Delta x_l$$

The x co-ordinate of the second interior point $(x_2, y_2)$ is determined by subtracting the right input range $\Delta x_r$ from the input upper boundary $Y_{max,in}$ of the input dynamic range $\Delta Y_{dyn,in}$.

$$x_2 = Y_{max,in} - \Delta x_r$$

An end gain, or slope, $\alpha_e$ is determined for the left and right segments in the range. The slope of the left segment is equivalent to the slope of the right segment. A minimum gain $\alpha_{min}$ and a maximum gain $\alpha_{max}$ for the left and right segments have predetermined values. The maximum gain $\alpha_{max}$ is less than or equal to $\Delta Y_{dyn,out}/\Delta Y_{dyn,in}$, and is greater than the minimum gain $\alpha_{min}$. The gain $\alpha_e$ is computed as:

$$\alpha_e = \alpha_{max} - (\alpha_{max} - \alpha_{min})p$$

where p is the exact percentage of the pixels that lie within the principal range. However, the exact value of p is difficult to determine in a real-time setting, because it involves reexamining all pixels once the principal range is determined. As a result, an estimated percentage of pixels $p_a$ is determined using the histogram. The number of pixels in bins that are completely covered by the principal range is summed. The estimated percentage of pixels $p_a$ is calculated from this sum and used in lieu of the exact percentage p. In future implementations, however, it may be possible to determine the exact percentage p in real-time.

The bins in the histogram are indexed from 0 to $(N_{bin}-1)$. The equations for finding the boundary bins that lie within the principal range are:

$$StartBinIndex = \left\lceil \frac{\Delta x_l + \Delta x_l^{(ext)}}{binSize} \right\rceil$$

$$EndBinIndex = StartBinIndex + N_{bin,p} - 1$$

where the bins in the principal range are bounded at one end by StartBinIndex and at anotherend by EndBinIndex. Also, the calculation for StartBinIndex is rounded up to the next highest integer.

Therefore, the end gain, $\alpha_e$, is actually computed 508 using the approximation:

$$\alpha_e = \alpha_{max} - (\alpha_{max} - \alpha_{min})p_a$$

$$= (\alpha_{min} - \alpha_{max})p_a + \alpha_{max}$$

Empirical results show that the gains (slopes) of the mapping function in the dark (left) and bright (right) regions should be less than or equal to $\Delta Y_{dyn,out}/\Delta Y_{dyn,in}$. That is, it is preferable that no expansion of the dynamic range is allowed.

This restriction implies that the gain of the middle segment has to be greater than or equal to $\Delta Y_{dyn,out}/\Delta Y_{dyn,in}$ to preserve the dynamic range at the output. As a result, the smaller the gains for the left and right segments, the larger the gain is for the middle segment.

The positions of the interior points $(x_1, y_1)$ and $(x_2, y_2)$ are calculated 510 as:

$$x_1 = Y_{min,in} + \Delta x_l$$

$$y_1 = Y_{min,out} + \alpha_e \Delta x_l$$

$$x_2 = Y_{max,in} - \Delta x_r$$

$$y_2 = Y_{max,out} - \alpha_e \Delta x_r$$

A middle segment gain $\alpha_m$ is calculated as:

$$\alpha_{in} = \frac{y_2 - y_1}{x_2 - x_1}$$

Since the gains for both the end segments and the middle segment are dependent on the percentage of pixels that fall in the principal range, both unimodal and bimodal cases are accounted for. For example, if the image intensity distribution is unimodal, then a relatively large portion of pixel intensities accumulate about the mean, as illustrated in FIG. 2. The principal range is established to coincide with the mean, as previously described. Therefore, the estimated percentage of pixels that fall within the principal range is relatively high. As the estimated percentage of pixels that fall within the principal range approaches 100%, the end gain $\alpha_e$ approaches the minimum gain $\alpha_{min}$. This results in a maximum compression of the left and right segments, which is the desired effect for a unimodal intensity distribution having a majority of its pixels in the middle segment. Furthermore, because the gains for the left and right segments are relatively low, the difference between midpoints $y_2$ and $y_1$ is large, yielding a large middle segment gain $\alpha_m$.

Alternately, if the image intensity distribution is bimodal, then there are two relatively large portions of pixel intensity, typically accumulating towards opposite ends of the middle segment, as illustrated in FIG. 3. In such a case, the mean typically falls between the two peak intensity density areas. Again, the location of the principal range tracks the mean. Therefore, in this example, the estimated percentage of pixels that fall in the principal range will be relatively low. As the estimated percentage of pixels that fall within the principal range approaches 0%, the end gain $\alpha_e$ approaches the maximum gain $\alpha_{max}$. This results in a minimum compression of the left and right segments, which is the desired effect for a bimodal intensity distribution, since a majority of its pixels are towards the left and right segments. Consequently, because the gains for the left and right segments are relatively high, the difference between midpoints $y_2$ and $y_1$ is small, yielding a small middle segment gain $\alpha_m$.

For both unimodal and bimodal cases, the pixel intensities are then mapped in accordance with the newly created mapping function as follows 512. The input intensity $Y_{in}$ for each pixel is examined. If the input pixel intensity $Y_{in}$ is less than $x_1$, the output pixel intensity $Y_{out}$ is determined in accordance with the end gain $\alpha_e$.

$$Y_{out} = \text{round}((Y_{in} - Y_{min,in})\alpha_e + Y_{min,out})$$

If the input pixel intensity $Y_{in}$ is between the interior points $x_1$ and $x_2$, the output pixel intensity $Y_{out}$ is determined in accordance with the middle gain $\alpha_m$.

$$Y_{out} = \text{round}((Y_{in} - x_1)\alpha_m + y_1)$$

If the input pixel intensity $Y_{in}$ is greater that the interior point $x_2$, the output pixel intensity $Y_{out}$ is determined in accordance with the end gain $\alpha_e$.

$$Y_{out} = \text{round}((Y_{in} - x_2)\alpha_e + y_2)$$

For all of the about equations, the round function rounds the result to the closest integer within the range $[Y_{min,out}, Y_{max,out}]$.

For each pixel in the image, the above calculations are performed. However, performing such a large number of calculations is computationally expensive. An alternate solution is to create a mapping table 514. In order to create the mapping table, the equations above are implemented once for each value in the input dynamic range. In the present embodiment, the intensity level (Y) is adjusted by −128 for internal processing and the dynamic range is 256. Therefore, the largest possible range of Y becomes [−128, 127]. The result for each calculation is stored in the mapping table. The mapping table then functions as a lookup table for the pixels in the image. In order to determine the output intensity for a given pixel, its input intensity is provided to the mapping table. The mapping table looks up the input intensity and provides a corresponding output intensity.

It is worth noting that, in the context of this description, the overall luminance of the image can be altered in conjunction with image contrast. Typically, an increase or decrease in luminance is achieved by the addition of a constant positive or a constant negative offset to the Y channel. The piecewise linear mapping allows for an extension of this idea so that a non-linear luminance can be either added or subtracted from the Y channel. This has some beneficial effects on the image. For instance, the additive non-linear Y offset, as illustrated in FIG. 5, is a three segment piecewise linear offset whose end-points diminish to zero. Adding this offset to the luminance Y channel results in an image that has increased luminance (brightness). Furthermore, it does so in a way that does not destroy detail in the near black (dark) and near white (bright) regions to the extent that detail can be destroyed (lost) when a constant offset is added. The reason for the improvement is the non-linear profile is less likely to cause clipping (saturation) of the luminance channels at the white (bright) and black (dark) levels because the additive or subtractive brightness tapers to zero.

The above description details a dynamically enhanced colour space (DECS). The DECS uses a three-segment piecewise-linear mapping that need not be continuous. The segments are each derived from a histogram and the mean value of the luminance channel of the image content. The mapping is used to scale each spatial component of the image data so that its local dynamic range has been altered in such a way so as to enrich the quality of the perceived image. Furthermore, control logic examines the distribution of the luminance data and treats unimodal distributions differently from bimodal distributions. In this way, the contrast enhancement scheme described herein improves the perceived image quality across a wider range of images. The scheme also allows for user control over the colour channels to allow for the independent enhancement of the colour content in the image scene, as described below.

Theoretically, contrast enhancement works with luminance data only, such as the Y channel when the YUV format is used. However, it is often visually pleasing to alter the distribution of the U and the V channels in a similar way as the Y channel. The overall effects of applying contrast enhancement to both luminance and chrominance is to infuse the image with more vivid color and greater perceptual depth. Therefore, it is tempting to extend the adaptive contrast enhancement technique described above to further include U and V data. However, using the same technique for altering chrominance as for luminance can have an adverse side effect. That is, the resultant image may comprise a modulating solid colour of image content that is supposed to have constant colour. A colour on a monotone wall, for example, can "breath" as the image content undergoes changes, changes that are the result of motion in the image scene. That is, as the foreground image content changes, the background colour also does. This is an undesirable effect. Therefore, while adaptive contrast enhancement works well on Y, it is preferable that it is not applied to U and V. Rather, a static mapping under user control is applied separately to the U and V channels.

In the YUV format, the U and V components determine the colour in the image. Colour enhancement is achieved by adjusting a static mapping based on user-defined parameters. The algorithm performs a mapping of the input pixel chroma level to the output pixel chroma level. The algorithm processes the U channel and the V channel separately. It can be thought of as a non-linear adjustment to saturation, which is a gain applied to the U and V channels. The mapping allows for a retention of some color components that would normally have been fully saturated had a constant gain been applied across all colour values.

Figure 6:
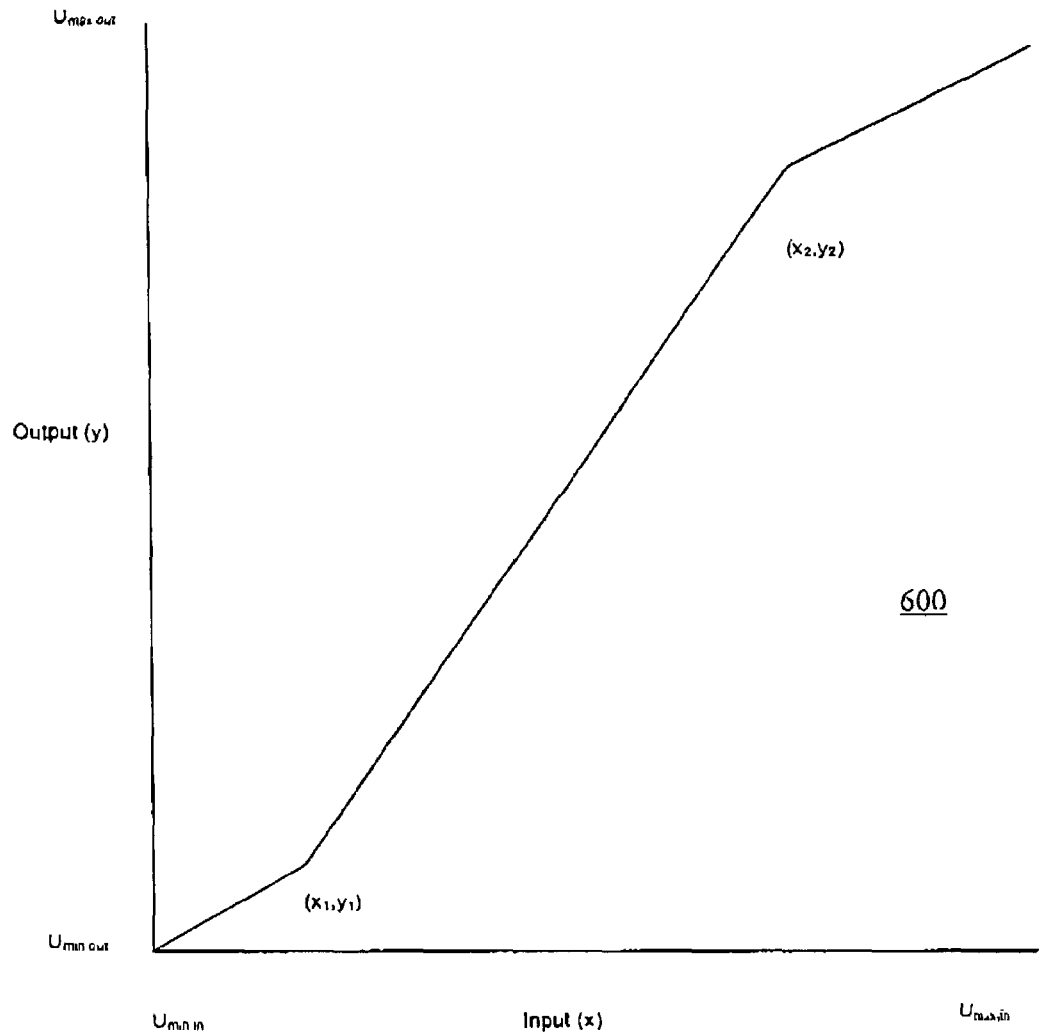
FIG. 6 is an illustration of the mapping that is used to alter the colour saturation of the colour components of the image.

Referring to FIG. 6 a static mapping function for the hue (U) channel is illustrated generally by numeral 600. Four points ($U_{min,in}$, $U_{min,out}$), ($x_1,y_1$), ($x_2,y_2$), ($U_{max,in}$, $U_{max,out}$) are defined, where points ($x_1,y_1$), ($x_2,y_2$) are referred to as interior points. The horizontal (x) positions of the interior points are design parameters with the constraint that $x_1<x_2$, and the vertical (y) positions are user-defined with the constraint that $y_1<y_2$.

It should be noted that the hue level (U) is adjusted by −128 for internal processing. Therefore, assuming a dynamic range of 256, the range of values becomes [−128, 127].

The slopes (gains) of the line segments are:

$$\alpha_l = \frac{y_1 - U_{min,out}}{x_1 - U_{min,in}}$$

$$\alpha_m = \frac{y_2 - y_1}{x_2 - x_1}$$

$$\alpha_r = \frac{U_{max,out} - y_2}{U_{max,in} - x_2}$$

Similar to intensity, the mapping function for the hue U is calculated as follows.

If the input pixel hue $U_{in}$ is less than $x_1$, then the output pixel hue $U_{out}$ is:

$$U_{out} = \text{round}((U_{in} - U_{min,in})\alpha_l + U_{min,out})$$

If the input pixel hue $U_{in}$ is between $x_1$ and $x_2$, then the output pixel hue $U_{out}$ is:

$$U_{out} = \text{round}((U_{in} - x_1)\alpha_m + y_1)$$

If the input pixel hue $U_{in}$ is greater than $x_2$, then the output pixel hue $U_{out}$ is:

$$U_{out} = \text{round}((U_{in} - x_2)\alpha_r + y_2)$$

For the above equations, the round function rounds the results to the closest integer within the range [$U_{min,out}$, $U_{max,out}$]. Alternately, as was described with regard to the intensity, a mapping table may used.

The same method for determining a static mapping function applies to saturation V adjustment as it does to hue U, with all occurrence of the suffix U replaced by V.

Definitions:

| Term | Description |
|---|---|
| $Y_{min,in}$ | Minimum input intensity value |
| $Y_{max,in}$ | Maximum input intensity value |
| $Y_{min,out}$ | Minimum output intensity value |
| $Y_{max,out}$ | Maximum output intensity value |
| $\Delta Y_{dyn,in}$ | Length of input dynamic range |
| $\Delta Y_{dyn,out}$ | Length of output dynamic range |
| $\alpha_e$ | The gain (slope) of the end (i.e. left and right) segments |
| $\alpha_m$ | The gain (slope) of the middle segment |
| $\alpha_{min}$ | The minimum gain for the left and right segments |
| $\alpha_{max}$ | The maximum gain for the left and right segments (less than or equal to $\Delta Y_{dyn,out}/\Delta Y_{dyn,in}$); $\alpha_{max} \geq \alpha_{min}$ |
| $\Delta x_l$ | The length of the range covered by the left segment |
| $\Delta X_m$ | The length of the range covered by the middle segment; wider than or equal to the principal range |
| $\Delta x_r$ | The length of the range covered by the right segment |
| $\Delta x_l^{(ext)}$ | Extension to $\Delta x_l$; it helps mark the left boundary of the principal range; it is needed because we want the length of the range covered by the middle segment to be longer than the principal range. |
| $\Delta X_{min}$ | The minimum permissible $\Delta x_l$ and $\Delta x_r$ |
| $\Delta x_{max}$ | The maximum permissible $\Delta x_l$ and $\Delta x_r$ |
| $N_{bin,p}$ | Width of the principal range in number of bins; has to be an integer |
| P | Percentage of pixels that lie in the principal range |

The terms in bold and non-Italic are either design parameters or user-defined. The remainder are calculated values.

The embodiments of the invention in which an exclusive property or privilege is claimed as defined as follows:

1. A method for enhancing contrast in a plurality of images in a video sequence by mapping an input intensity value to an output intensity value in accordance with a mapping function, the method comprising the steps of:
    (a) determining a mean intensity value of the image;
    (b) calculating the mapping function including left, right, middle, and principal range, the principal range being contained within the middle range;
    (c) applying the mapping function to the input intensity value for determining said output intensity responsive to determining the modality;
    (d) determining that the image is likely unimodal if a percentage of image pixels that lie in the principal range is above a first predefined threshold; and
    (e) determining that the image is likely bimodal if the percentage of image pixels that lie in the principal range is below a second predefined threshold;
    (f) dynamically generating the mapping function for each image in the video sequence.

2. A method as defined in claim 1, wherein the method further includes the steps of
    (g) calculating gains for the mapping function in accordance with the percentage of image pixels that lie in said the principal range.

3. A method as defined in claim 2, wherein calculating the mapping function comprises calculating a left segment, a middle segment, and a right segment, the left and right segments having again less than unity and the middle segment having a gain larger than unity.

4. A method as defined in claim 3, wherein decreasing the gains for said left and right segments and increasing the gain for the middle segment as the percentage of image pixels that lie in the principal range increases.

5. A method as defined in claim 3, wherein the gains for said left and right segments are increased and the gain for said middle segment is decreased as the percentage of image pixels that lie in the principal range decreases.

6. A method as defined in claim 1 wherein the first predefined threshold is equivalent to the second predefined threshold.

7. A method as defined in claim 3, wherein the mapping function is piecewise linear.

8. A method as defined in claim 3, wherein the mapping function is stored in equation form and applied to the input intensity value to obtain the output intensity value for each pixel in each image.

9. A method as defined in claim 3, wherein the mapping function is stored in a table by calculating corresponding output intensity values for all possible input intensity values and applied to the input intensity value by looking up the input intensity value in the table and retrieving the corresponding output intensity value.

10. A method as defined in claim 1, wherein a piecewise linear offset is added to the intensity for increasing the overall luminance of at least one of the plurality of images.

11. A method as defined in claim 1, wherein the contrast is further enhanced by applying a static mapping function to a colour channel of at least one of the plurality of images.

12. A method as defined in claim 1, wherein the contrast is further enhanced by applying a static mapping function to a hue channel of at least one of the plurality of images.

13. A method as defined in claim 1, including calculating the mapping function in accordance with user-defined preferences.

14. A system for enhancing contrast in a plurality of images in a video sequence by mapping an input intensity value to an output intensity value in accordance with a mapping function, the system comprising:
histogram hardware comprising a plurality of counters, comparators, and control logic to generate a histogram and to calculate a mean intensity value responsive to the histogram; and
a processor to calculate left, right, middle, and principal ranges of the mapping function in accordance with the mean intensity value and a plurality of predefined parameters, to determine a modality of each image responsive to the principal range, and to apply the mapping function to the input intensity value to determine the output intensity responsive to the modality;
where the principal range is contained within the middle range; and
wherein the mapping function is generated dynamically for each image in the video sequence;
where the processor is adapted to determine that the image is likely unimodal if a percentage of image pixels that lie in the principal range is above a first predefined threshold;
where the processor is adapted to determine that the image is likely bimodal if the percentage of image pixels that lie in the principal range is below a second predefined threshold.

15. The system of claim 14 where the processor is adapted to calculate gains for the mapping function in accordance with the percentage of image pixels that lie in the principal range.

16. The system of claim 15 where the processor is adapted to calculate a left segment, a middle segment, and a right segment, the left and right segments having a gain less than unity and the middle segment having a gain larger than unity.

17. The system of claim 16 where the processor is adapted to decrease gains for the left and right segments and to increase gain for the middle segment as the percentage of image pixels that lie in the principal range increases.

18. The system of claim 16 where the processor is adapted to increase gains for the left and right segments and to decrease the gain for middle segment as the percentage of image pixels that lie in the principal range decreases.

19. The system of claim 14 where the first predefined threshold is equivalent to the second predefined threshold.

20. The system of claim 14 where the mapping function is piecewise linear.

21. The system of claim 14 where the mapping function is stored in equation form and applied to the input intensity value to obtain the output intensity value for each pixel in each image.

22. The system of claim 14 where the mapping function is stored in a table by calculating corresponding output intensity values for all possible input intensity values and applied to the input intensity value by looking up the input intensity value in the table and retrieving the corresponding output intensity value.

23. The system of claim 14 where the processor is adapted to add a piecewise linear offset to the intensity for increasing the overall luminance of at least one of the plurality of images.

* * * * *

UNITED STATES PATENT AND TRADEMARK OFFICE
CERTIFICATE OF CORRECTION

PATENT NO.        : 7,127,123 B2
APPLICATION NO.   : 10/177766
DATED             : October 24, 2006
INVENTOR(S)       : Finn Wredenhagen and Peter Ang Page 1 of 1

It is certified that error appears in the above-identified patent and that said Letters Patent is hereby corrected as shown below:

Column 10, line 67, the words "in said the principal" should be replaced with -- in the principal --.

Signed and Sealed this

Fifth Day of August, 2008

JON W. DUDAS
*Director of the United States Patent and Trademark Office*